United States Patent Office 2,879,645
Patented Mar. 31, 1959

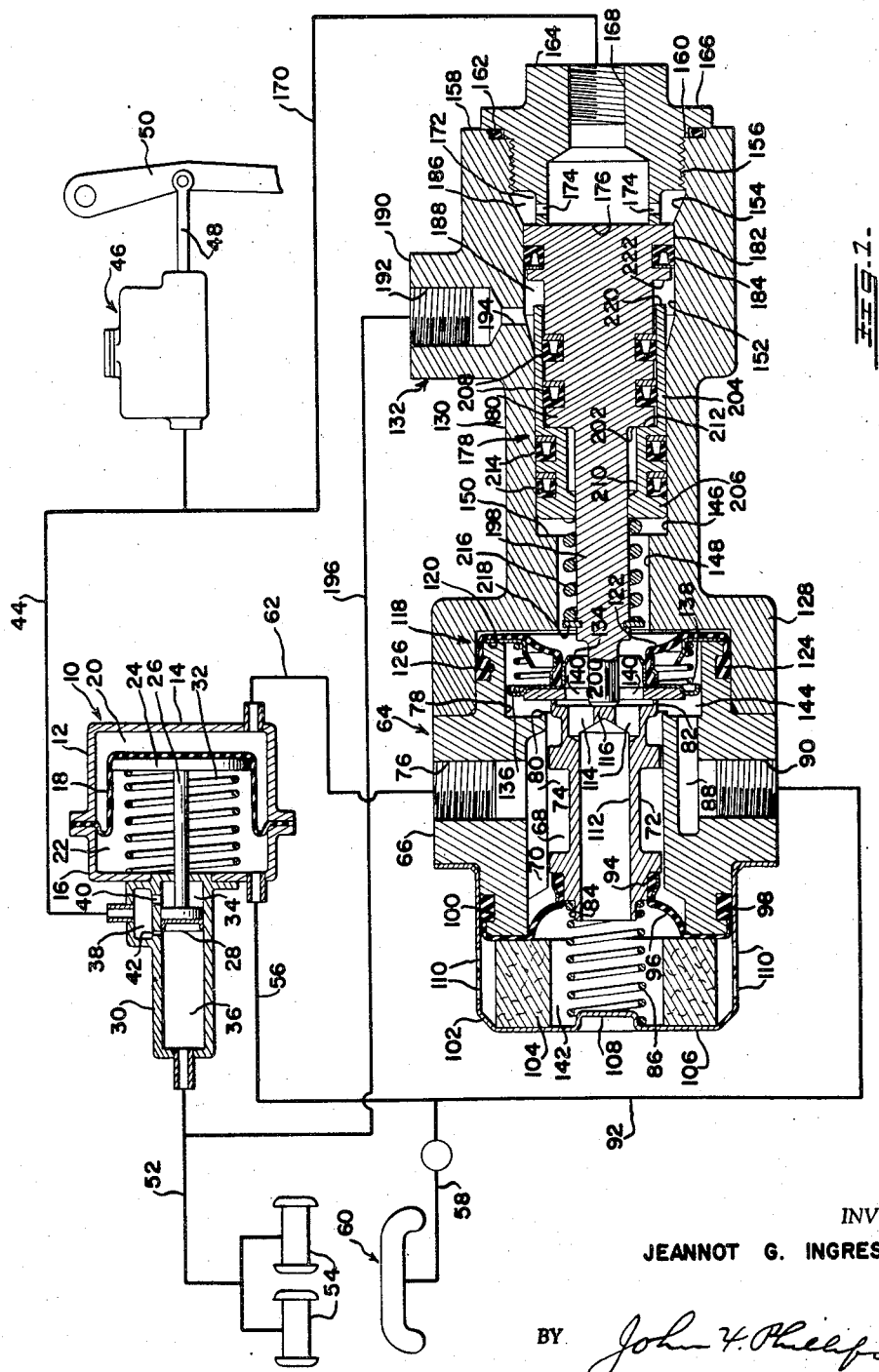

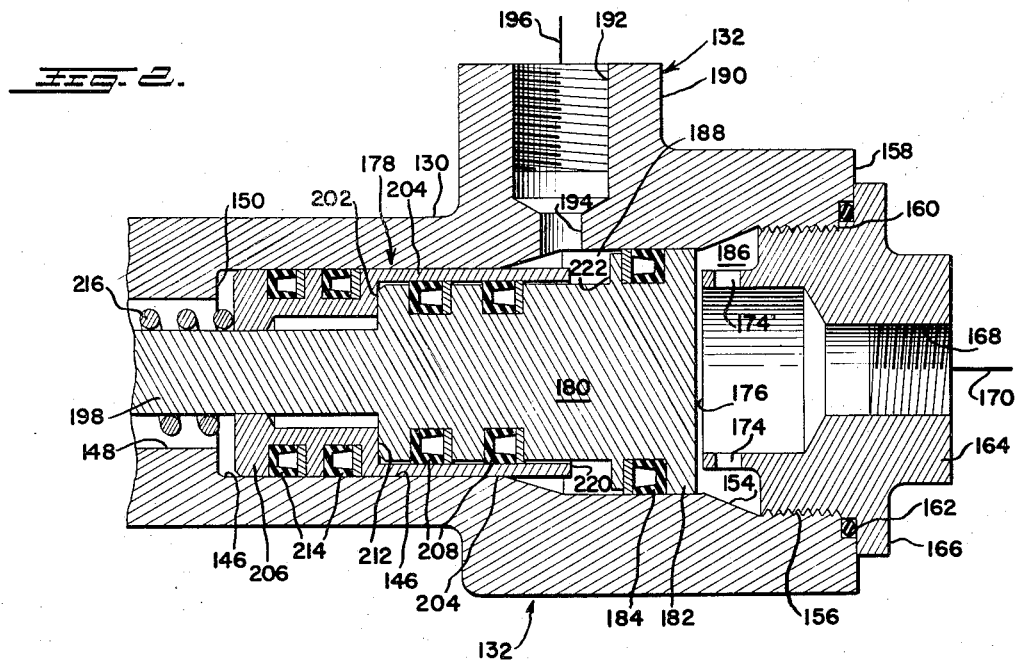
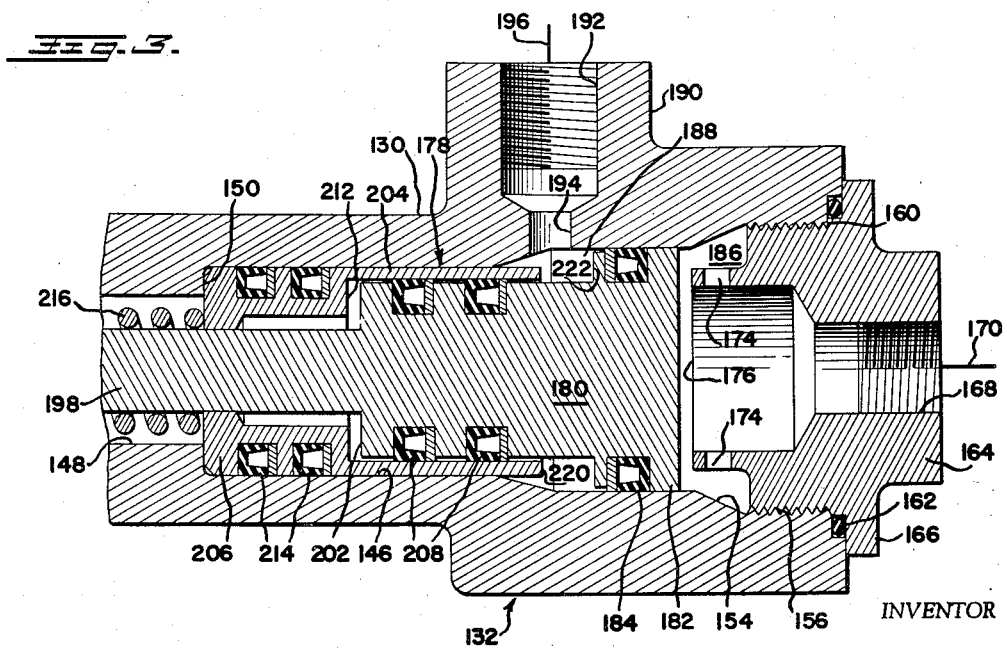

2,879,645

BOOSTER BRAKE MECHANISM

Jeannot G. Ingres, Dearborn, Mich., assignor to Kelsey-Hayes Company, Detroit, Mich., a corporation of Delaware Application April 22, 1957, Serial No. 654,266

9 Claims. (Cl. 60—54.6)

This invention relates generally to hydraulic booster systems, and is more particularly concerned with a hydraulic booster system incorporating an improved reaction device.

This invention constitutes an improvement over my co-pending application for patent Serial No. 612,794, filed September 28, 1956 and incorporates therein similar co-operating components providing improved "feel" characteristics in the booster system.

It is important in vehicles incorporating booster brake systems utilizing a power unit for supplementing physically applied force, that the operator thereof have a feeling of control over the braking of the vehicle at all times i.e. that the system afford "feel" or "reaction" characteristics in a ratio relative to the deceleration of the vehicle.

Various earlier booster brake systems incorporated undesirable operational characteristics such as an initial "hard" pedal "feel" prior to activation of the booster motor of the system followed by a drop or "falling away" at the brake pedal upon initial activation of the booster motor. Other systems proposed immediate activation of the booster motor upon pedal actuation, such systems failing to afford desirable "feel" characteristics and affording to an operator of the system a "falling" away sensation at the brake pedal. Various interim reaction means were later proposed for resisting brake pedal movement during the course of its actuation.

In booster brake systems of the character involved, it is desirable to utilize direct hydraulic reactions against movement of the brake pedal to afford to the operator a "feel" characteristic proportional to brake application, and when utilizing interim reaction means for transmitting various "stages" of reaction, it is further desirable that the transition stage between said stages be as smooth as possible without resulting in a "falling" away of the brake pedal, or a "lumpy" feeling during such transition stage. It has been further found desirable to employ hydraulic reaction throughout the range of booster brake system operation, and an important object of this invention is to provide in a system of the character involved means whereby activation of a booster motor of the system results in a build up of brake line pressure, a direct hydraulic reaction being transmitted to the brake pedal, and a plurality of stages of hydraulic reaction being progressively transmitted to said pedal from initial movement of the brake pedal from an "off" condition to the point at which direct hydraulic reaction pressures are applied against the brake pedal as the booster motor generates brake applying hydraulic pressures.

A further object of invention in conformance with that set forth is to provide in a hydraulic booster system of the character involved the means for progressively transmitting stages of hydraulic fluid pressure reaction to eliminate a "lumpy" feeling during the interim of transition of different stages of hydraulic fluid pressure reactions.

A further object of invention in conformance with that set forth is to provide in a hydraulic booster system of the character involved an improved reaction device transmitting initial hydraulic fluid pressure reaction to the operator of a brake pedal at brake line pressures below a predetermined value, and subsequently transmitting to the operator of the brake pedal a higher degree of hydraulic fluid pressure reaction at brake line pressures above said predetermined value, said reaction device including means whereby the transition stage between stages of reaction transmitted to the operator of the brake pedal are relatively imperceptible at the brake pedal and afford desirable and positive "feel" characteristics during a cycle of brake application.

A further object of invention in conformance with that set forth is to provide in a hydraulic booster system of the character involved an improved reaction device operatively associated with a pedal-actuated power unit for activating the hydraulic booster system, said reaction device including a hydraulic pressure responsive unit subject to brake line pressures built up in the booster system and including opposed reaction surfaces acting in opposition when subjected to brake line pressures below a predetermined value, and wherein the reaction surfaces do not act in opposition to each other above a predetermined value of brake line pressure.

Other objects and advantages of this invention will become apparent from a consideration of the following description, taken in connection with the accompanying drawing, wherein an embodiment of this invention is disclosed by way of example.

In the drawing:

Figure 1 is a view showing in section the booster motor control valving and reaction means, portions of the booster motor being shown in diagrammatic section, and co-operating components being illustrated diagrammatically, the parts being shown in normal or "off" positions;

Figure 2 is an enlarged fragmentary portion of Figure 1, showing in detail the reaction means of the system, the parts being shown in a position wherein "initial" or "first-stage" reaction is transmitted in the system; and Figure 3 is a view similar to Figure 2, showing a further position of the parts wherein "secondary" or "second-stage" reaction is transmitted in the system.

Referring to the drawing in detail, indicated generally at 10 is a booster motor, similar in character to that disclosed in my co-pending application, and including a hollow body member 12 comprised of suitably secured mating sections 14 and 16 which clampingly engage opposite sides of a transverse pressure responsive movable wall 18, illustrated as the "flexible diaphragm" type, which defines in the body member opposed variable volume chambers 20 and 22. Suitably secured centrally of the pressure responsive movable wall 18 is a head or mounting member 24 integral with a laterally extending piston rod 26 incorporating on the terminal end thereof a suitable plunger 28. The mating section 16 has extending laterally therefrom in co-axial relationship relative to the piston rod 26 a suitable fluid cylinder 30 in which the plunger 28 is reciprocably disposed. Circumposed about the piston rod 26 in engagement with the mounting member 24 and the opposed surface of the mating section 16 is a suitable return spring 32. The return spring 32 tends to bias the piston to its "off" position shown in Figure 1.

The plunger 28 defines in the cylinder 30 variable volume primary and secondary chambers 34 and 36, respectively. The plunger 28 incorporates a suitable seal to prevent communication between the chambers 34 and 36.

The cylinder 30 includes thereon a portion forming a chamber 38 communicating through ports 40 and 42 with the primary secondary chambers 34 and 36, respectively. The chamber 38 communicates through a suitable hydraulic line 44 with a conventional master cylinder indicated generally at 46 operated by a force transmitting rod 48 operatively connected to a suitable actuating pedal 50, only a portion of which being shown in Figure 1, being disclosed as the "hanging" type. The port 42, as will be noted, is located adjacent the edge of the plunger 28 when the parts are disposed in the "off" position shown in Figure 1, and initial movement of the plunger 28 will close the port 42. The port 42 provides the means for maintaining a proper supply of hydraulic fluid in chamber 36 and in brake lines 52 communicating with suitable wheel cylinders 54, only a pair of said wheel cylinders having been illustrated in Figure 1.

The previously mentioned variable volume chamber 22 comprises a constant pressure chamber, and the variable volume chamber 20 comprises a variable pressure chamber. The constant pressure chamber 22 communicates through suitable lines 56 and 58 with a suitable source of vacuum, such as an intake manifold indicated generally at 60 forming a part of an internal combustion engine. The variable pressure chamber 20 communicates by means of a suitable line 62 with control valve means indicated generally at 64 in a manner to subsequently become apparent.

The control valve means 64 to subsequently be described in detail does not comprise a part of this invention and is comparable in function to the valve mechanism disclose in detail in the aforementioned co-pending application for patent. The control valve means 64 comprises a suitably constructed body member 66 having extending through opposite ends a suitably formed bore 68 defined at one side by a plurality of longitudinally extending splines 70, only one being shown. The bore 68 has slidably disposed therein an elongated valve body 72. The splines 70 are suitably spaced and define therebetween as indicated at 74 a suitable passage communicating with a laterally opening port 76 connected to the line 62 for communication with the variable pressure or control chamber 20. The body member 66 has formed in one end thereof an annular chamber 78 which may communicate with the line 62 through the bore 68, passage 74 and port 76. Communication between the chamber 78 and the bore 68 is controlled by an annular valve seat 80 extending into the chamber 78 and extending about the adjacent end of the bore 68. The valve body 72 has formed on the end thereof extendible into the chamber 78 an annular valve seat 82 of a diameter smaller than the annular valve seat 80. The opposite end of the valve body incorporates thereon a reduced diameter portion 84 receiving thereon one end of a suitable compression or biasing spring 86 which serves to bias the valve body to an "off" condition wherein the booster motor will not be activated, in a manner to subsequently be described in detail.

Communicating with the chamber 78 and extending longitudinally in the body member 66 is a passage 88 communicating with a laterally opening port 90, which may be diametrically opposed to the port 76, if preferred, said port 90 communicating with a suitable line 92 communicating with line 58 operatively connected to the manifold 60. During the "off" condition of the booster system, the vacuum from the manifold 60 will be communicated through the lines 56 and 58 to chamber 22, and at the same time will communicate through lines 58 and 92 through the port 90, passage 88, past the valve seat 80 through the bore 68 and port 76 to the line 62 which is in communication with chamber 20 and thus the pressure in the variable volume chambers 20 and 22 will be equal. Although a "vacuum suspended" booster motor has been disclosed in the exemplary embodiment, the booster motor may be "air-suspended" and operated by super-atmospheric pressure, or may be of any other suitable character desired. In this regard, details of construction of conventional booster motors of the character which might be utilized in a system of the type involved is believed to be unnecessary inasmuch as the booster motor per se does not constitute the invention as will subsequently be described in detail.

The valve body 72 incorporates an annular shoulder portion 94 opposite the end upon which the annular valve seat 82 is formed, said shoulder 94 receiving thereon in circumposed suitably secured sealed relationship the central portion of a transversely apertured flexible diaphragm 96 extending over the adjacent end of the body member 66 and including a peripheral flange portion 98 received in an annular groove 100 about an intermediate outer surface portion of the body member 66. The sealing diaphragm 96 is retained on the body member 66 by means of a suitably conformed retaining cap 102 engaging one end of a transversely apertured annular filter element 104, the opposite end of which being juxtaposed on the sealing diaphragm 96. The sealing cap 102 incorporates in its end 106 an inwardly directed portion 108 which receives thereon the other end of the compression or biasing spring 86. Extending transversely through the side of the sealing cap 102 is a plurality of transverse apertures 110 permitting air to be communicated through the filter element 104 to the valve body 72. The valve body 72 has extending longitudinally therethrough a bore portion 112 communicating with a plurality of passages 114 extending through a transverse end wall 116 of the valve body.

The end of the body member 66 opposite that upon which the sealing diaphragm 96 is disposed incorporates a poppet valve assembly indicated generally at 118 comprising an annular mounting ring 120 circumposed on the end of the body member 66 and having juxtaposed thereon a second flexible sealing diaphragm 122 which includes a peripheral flange portion 124 received within an annular groove 126 extending about the outer surface of the body member 66 and being retained thereon by means of an annular flanged portion 128 of an axially extending body member 130. The body member 130 comprises a portion of a reaction unit indicated generally at 132, the function of which is subsequently described in detail. The flexible diaphragm 122 is centrally apertured and suitably secured on a transversely apertured clamp ring 134 which includes an annular abutment plate 136 disposed in spaced relationship from the mounting plate 120. Circumposed about the clamp ring 134 is a suitable coiled biasing spring 138, opposite ends of which respectively engage the abutment plate 136 and mounting plate 120, the spring 138 being overbalanced by the spring 86 and accordingly the mounting plate 136 is urged toward the annular valve seat 82 as clearly seen in Figure 1. The abutment plate 136 has suitably secured on the side opposite that which is engaged by spring 138 a centrally apertured annular sealing disc element 140 sealingly engageable with the annular valve seat 82 during the normal "off" condition of the parts, or subsequently engageable with the annular valve seat 80 when the control valve means 64 is activated.

The flexible diaphragm 96 defines an air chamber 142 communicating exteriorly to atmospheric pressure through the filter element 104 as previously mentioned, and the flexible diaphragm 122 defines within the body member 66 a chamber 144 exposed to the manifold vacuum when the parts are in the condition shown in Figure 1. Leftward movement of the poppet valve assembly 118 through the medium of the reaction unit 132, as will subsequently be described, will result in overcoming the loading of the spring 86, moving the valve body 72 axially within body member 66 until the sealing element 140 engages the annular valve seats 82 and 80. When this occurs, the valve assembly 118 is in a "lapped" condition, and continued axial movement of the valve assembly 118 toward the left will result in "cracking" the chamber 142 to communicate with the passage 74, this accordingly communicating atmospheric pressure to the control chamber 20 of the booster motor 10. The initial movement of the valve assembly 118 toward the annular valve seat 80 through the medium of the reaction unit 132 is assisted by the biasing spring 138, and the increment of time or lag in cracking the chamber 144 to communicate with the passage 74 could be equivalent to the taking up of brake shoe-to-brake drum clearances, which can be accomplished by initial movement of the brake pedal 50. At this time, the booster motor 10 would not supplement manually applied force imposed by an operator of the booster system.

The body member 130 of the reaction unit 132 has extending longitudinally therethrough in co-axial relationship with the bore 68 of the control valve means 64 a bore portion 146 reduced in diameter adjacent the body member 66 as indicated at 148 and communicating with chamber 78. The bore portions 146 and 148 define therebetween an annular abutment shoulder 150. The bore portion 146 is formed at the opposite end in an increased diametered bore portion 152 which continues in a still further increased diametered portion 154 having threads 156 about its inner periphery, said portion 154 opening into the end 158 of said body member 130. The end 158 of the body member 130 is undercut as indicated at 160 receiving therein a suitable seal such as an O-ring 162. Received on threads 156 is a suitably conformed plug element 164 incorporating an annular clamp ring 166 engaging the seal 162. The plug element 164 has extending transversely therethrough in co-axial relationship relative to the bore 146 a port 168 communicating through a suitable line 170 to the master cylinder 46. The opposite end of the plug element 166 is undercut as indicated at 172, said portion having extending therethrough radially spaced transverse ports 174. The plug element 166 terminates in an annular abutment shoulder 176 the function of which to subsequently become apparent.

Indicated generally at 178 for axial movement within the bore 146 is a "two-stage" piston assembly. The piston assembly 178 includes an inner elongated piston or plunger member 180 including at one end an annular concentrically disposed head portion 182 conforming to the bore portion 152. The head 182 has circumposed thereabout a suitable seal indicated at 184. The head 182 will abuttingly engage the shoulder 176 of the plug element 166, and defines adjacent to said abutting end a control chamber 186 on one side thereof, and a reaction chamber 188 on the opposite side thereof. Formed integrally with the body member 130 is a laterally extending boss 190 having a port 192 extending therethrough and communicating at 194 with the reaction chamber 188. The port 192 communicates by means of a suitable hydraulic line 196 with line 52, which as previously mentioned is connected to the wheel cylinders 54 and in communication with the secondary chamber 36 of cylinder 30 of the hydraulic booster 10. Accordingly, in the absence of description of additional structure, and function of the parts, the built up of brake line pressure in the line 52 will be transmitted through the line 196 to the reaction chamber 188, this being the high pressure line of the hydraulic booster system. It will be noted that the control chamber 186 communicates through the medium of the ports 174 and the hydraulic line 170 with the pedal operated master cylinder 46, this being the low pressure side of the system.

The plunger 180 includes an axial projection or stem 198 of a substantially reduced diameter extending through the bore 148 within the recess 78 of the body member 66 of the valve means 64, the terminal end 200 of which abuttingly engages the end wall 116 of the valve body 72. The stem 198 forms on the plunger 180 an intermediate annular abutment shoulder 202. Circumposed about the plunger 180 is an open-ended tubular sleeve piston 204 including a transversely apertured end wall 206 through which the stem 198 extends. The sleeve piston 204 conforms to the outer periphery of the plunger 180, said plunger 180 having circumposed thereabout suitable seals 208 which prevent the escape of high pressure hydraulic fluid contained within the reaction chamber 188. The sleeve piston 204 has extending from the end wall 206 a reduced diametered portion 210 of a lesser diameter than that portion circumposed about the plunger 180 and accordingly forming therewith an annular abutment shoulder 212 abuttingly engageable with the shoulder 202 of the plunger 180 in the manner shown in Figure 1, this being the "off" position of the reaction unit. The tubular piston 204 has circumposed thereabout suitable seals 214 functioning to prevent the leakage of high pressure brake line fluid along the outer periphery of the sleeve piston 204 in the bore 146 in the reaction unit.

Circumposed about the portion of the stem 198 which extends through the sleeve piston 204 is a biasing spring 216, one end of which engages the adjacent end wall 206 of the sleeve piston, the other end of which abuttingly engages a suitably secured annular abutment collar 218 fixed on an intermediate portion of the stem 198. The spring 216 is effective to bias the sleeve piston 204 relative to the stem 198 of the plunger 180 urging the shoulders 202 and 212 of the respective inner and outer pistons into abutting relationship when the reaction unit is in the "off" condition. When the parts are so positioned, the sleeve piston 204, as clearly seen in Figure 1, will be disposed in spaced relation from the shoulder 150 within the body member 130, and the opposite end of said sleeve piston comprises an annular reaction surface 220 in spaced opposed relationship to the adjacent side or reaction surface 222 on the head 182. Both of the reaction surfaces 220 and 222 are exposed to the high pressure hydraulic fluid which will be directed to the reaction chamber 188. Additionally, the effective area of the reaction surface 220 is smaller than that of the reaction surface 222.

*Operation*

The parts are normally disposed in the position shown in Figure 1. When a brake application is made, the operator of the system will depress the pedal 50 displacing hydraulic fluid from the master cylinder 46 through line 44 into chamber 36 and thence through line 52 to the wheel cylinders 54. At the same time, fluid is displaced through line 170 and the port 168 into the control chamber 186. This initial displacement of hydraulic fluid by the master cylinder results in taking up of brake shoe-to-drum clearances and at the same time reacts against that surface of the plunger 180 which is exposed to the pressure of the fluid in control chamber 186. This initial application of fluid pressure results in leftward movement of the piston assembly 178, overcoming the biasing force of the spring 86 resulting in activation of the control valve means 64. Activation of the control valve means 64 results in leftward movement of the pressure responsive movable wall 18 of the booster motor 10 causing fluid to be displaced from the chamber 36 through the line 52 to the wheel cylinders 54. At the same time hydraulic fluid pressure generated by the booster motor 10 will be transmitted through the line 196 to the reaction chamber 188.

Considering Figure 2, initial depression of the brake pedal lever resulted in movement of the piston assembly 178 as a unit toward the left, moving the piston assembly away from the abutment shoulder 176 of the plug element 166. The generated high pressure hydraulic fluid in the reaction chamber 188 will react against the opposed reaction surfaces 220 and 222, and inasmuch as the effective reaction area of the reaction surface 222 is greater than that of the reaction surface 220, the piston assembly 178 will tend to move toward the right as viewed in Figure 2, to act upon the hydraulic fluid in the control chamber 186 and transmit a predetermined force or "feel" to the operator actuating the brake pedal through the medium of the hydraulic fluid communicating with the master cylinder 46. During this period, it will be noted, the biasing spring 216 has sufficient force to maintain the abutment shoulders 202 and 212 of the respective inner and outer pistons in engaged relationship wherein said pistons move as a unit as previously mentioned. The force of the high pressure hydraulic fluid in the reaction chamber 188, it will be observed, reacts against the reaction surface 220 tending to urge the sleeve piston 204 in a direction opposite that which the high pressure hydraulic fluid is tending to urge the plunger 180.

During the period of time wherein the biasing spring 216 is effective to maintain the shoulders 202 and 212 in engaged relationship, initial or first-stage reaction is transmitted to the operator of the system. A continual build up of high pressure hydraulic fluid in the reaction chamber 188, see Figure 3, will eventually be effective to overcome the force of the biasing spring 216 and urge the end wall 206 of the sleeve piston 204 into engagement with the shoulder 150 of the body member 130. At this time, the force imposed on the reaction surface 220 is directly transmitted to the body member 130 and does not act through the plunger 180 in opposition to the force on the reaction surface 222. Thus after a predetermined value of high pressure hydraulic fluid is transmitted to the reaction chamber 188, the entire effective area 222 of the plunger 180 will be acting on the hydraulic fluid in the control chamber 186 to accordingly transmit the reaction or "feel" characteristics to the operator of the hydraulic master cylinder.

This condition is defined as second stage reaction.

To state the function of two-stage reaction of the reaction unit in another manner, during first stage reaction, the high pressure side of the system will act on the effective area of the reaction surface 222 minus the effective area of the reaction surface 220. The low pressure side of the system acts on the effective area of the plunger 180 which is exposed in the control chamber 186. Therefore, the reaction or boost ratio during first stage reaction is:

$$\frac{\text{Area of head 182}}{(\text{Area of reaction surface 222}) - (\text{area of reaction surface 220})}$$

It is apparent that, within limits, as pressure builds up in reaction chamber 188, the hydraulic reaction against the pedal 150 will increase. This pressure will increase until a predetermined value is reached at which time there is sufficient force exerted against the reaction surface 220 to overcome the loading of the biasing spring 216, at which time the sleeve piston 204 will move to the left as clearly seen in Figure 3. When this condition occurs, the reaction or boost ratio becomes:

$$\frac{\text{Area of head 182}}{\text{Area of reaction surface 222}}$$

The second boost ratio is that denoting second stage reaction being transmitted to the operator of the brake pedal 50.

Thus, during first stage reaction, for example, wherein the high fluid pressure side of the line transmits a pressure between 40 and 70 pounds per square inch, this pressure will be sufficient to react against the reaction surface 220 of the sleeve piston 204 and move the same in the same direction as the entire piston assembly 178 was initially moved. The transition of transmittal of first to second stage reaction against master cylinder pressures in control chamber 186 is smooth, and hardly perceptible at the operator's pedal. This is especially apparent, when considering Figures 2 and 3, wherein during first stage reaction transmittal the entire piston assembly 178 moves in a common direction, the biasing spring 216 being effective to urge said inner and outer pistons together. During the transition period from first to second stage reaction, the spring 216 is effective to cushion the relative movement of the tubular sleeve piston 204 away from the abutment shoulder 202 of the plunger 180.

The effective areas of the reaction surfaces 220 and 222 can be varied over a relatively wide range, as can the effective area of the head 182 which is exposed to the pressures in the control chamber 186.

Although it has been mentioned that initial movement of the brake pedal for actuating the master cylinder of the system might be effective to displace hydraulic fluid to overcome the brake shoe-to-drum clearances, such clearances might be overcome by hydraulic fluid displacement during first stage reaction i.e. when the effective areas of the reaction surfaces 220 and 222 act in opposition to transmit reaction to the control chamber 186, for example, by starting out with a very high ratio between the high line pressure from the booster motor and that being transmitted by the master cylinder. In any event, the relative ratios of pressure transmittal for the purpose of transmitting reaction characteristics to the operator of the system are questions of design relating to the desired operational characteristics of the hydraulic booster system.

Although a specific control valve means has been disclosed in this application, said valve means does not constitute part of the invention in this application for patent and is disclosed in detail in the co-pending application for patent of Lawrence E. Pulkownik, Serial No. 655,208, titled Booster Brake Mechanism, filed on April 26, 1957. This application for patent and that of Lawrence E. Pulkownik having a common assignee.

The form of the invention shown and described, is intended to be a preferred example of the same, and various changes relative to size, shape and arrangement of the various cooperating components or parts may be made, not departing from the spirit of the invention or the scope of the appended claims.

What is claimed as new is as follows:

1. A hydraulic booster system comprising a hydraulic pressure booster including a hydraulic chamber, fluid-displacing plunger means movable thereinto, a differential pressure motor unit operatively connected to said plunger means, control means having fluid connection with said motor unit and with a power source and movable from a normal position to energize said motor unit, a reaction unit, a first piston slidably supported in said reaction unit, a second piston slidably supported in said first piston and including means defining opposed control and reaction chambers in the reaction unit, a pedal-operated master cylinder including a fluid connection communicating with the control chamber, a fluid connection communicating between the hydraulic and reaction chambers, said first and second pistons including spaced opposed reaction surfaces exposed in the reaction chamber, and spring means engaging the first piston biasing the pistons together in one direction toward the control chamber, means limiting movement of said first piston in the other direction away from the control chamber, fluid pressure in the reaction chamber below a predetermined value acting on the opposed reaction surfaces to cumulatively transmit a first stage reaction to the pedal-operated master cylinder, and fluid pressure above the predetermined value overcoming the spring means to move said first piston in said other direction whereby the entire reaction surface of the second piston transmits second stage reaction to the pedal-operated master cylinder.

2. A system as set forth in claim 1 wherein said second piston is operatively connected to the control means for actuating the same, and second spring means in the control means biasing the second piston toward a normal position in the reaction unit.

3. A system as set forth in claim 1 wherein said first piston comprises a tubular body member through which the second piston extends, said reaction unit including an abutment portion in spaced relation from a portion of the first piston remote from the reaction surface thereof to form said limiting means and defining the extent of movement of the first piston away from the control chamber, the pistons including cooperating abutment portions limiting the minimum spacing between the reaction surfaces, said spring means comprising a compression spring on the second piston and abuttingly engaging said first piston whereby the reaction surface of the first piston is effective until the force of the compression spring is overcome and the first piston engages the abutment portion of the control unit.

4. A hydraulic booster system comprising a hydraulic pressure booster including a hydraulic chamber, fluid-displacing plunger means movable thereinto, a motor unit operatively connected to said plunger means, control means operatively connected to said motor unit and a power source movable from a normal position to energize said motor unit, a reaction unit, co-axial inner and outer telescoped pistons slidably mounted in the reaction unit, the inner piston including means defining opposed control and reaction chambers, a pedal-operated master cylinder including a fluid connection communicating with the control chamber, a fluid connection communicating between the hydraulic and reaction chambers, the pistons including opposed reaction surfaces exposed in spaced relation in the reaction chamber, spring means engaged between the pistons urging the outer piston toward the control chamber, cooperating normally engaged abutment means between the pistons determining minimum spaced relation between the reaction surfaces and transmitting force from said spring to said inner piston whereby the pistons are normally biased to move as a unit in the direction of said control chamber, and abutment means in the reaction unit engageable with the outer piston upon movement thereof in the other direction when a predetermined fluid pressure is imposed in the reaction chamber to overcome said spring means, the reaction surface on said inner piston being larger than the reaction surface on said outer piston to provide a net reaction acting in said first-named direction until said spring is overcome to separate said normally engaged abutment means, whereupon the entire area of the reaction surface of said inner piston becomes effective for opposing movement of said inner piston in said other direction.

5. In a hydraulic booster system as set forth in claim 4 wherein said inner piston is operatively connected to said control means for actuating the same in response to pressure in the control chamber.

6. In a hydraulic booster system as set forth in claim 4 wherein said outer piston comprises a tubular sleeve circumposed about the inner piston, the cooperating abutment means on the pistons comprising intermediate engageable abutment shoulders thereon, said spring means comprising a compression spring circumposed about the inner piston in spaced relation from the abutment shoulder thereof, said compression spring means including one end engaging the outer piston remote from its reaction surface and another end abuttingly engaging a spaced intermediate portion of the inner piston.

7. In a hydraulic booster system as set forth in claim 6 wherein said inner piston is operatively connected to said control unit remote from the intermediate portion abuttingly engaging said compression spring.

8. A hydraulic booster system comprising a hydraulic chamber, a fluid displacing plunger movable thereinto, a differential pressure motor unit operatively connected to said plunger, valve means having connection with said motor unit and with a pressure source and movable from a normal position to energize said motor, a reaction unit, a first piston and a second piston in said reaction unit axially slidable for movement relative to each other and to said reaction unit, said second piston defining opposed control and reaction chambers in the reaction unit, a pedal operated master cylinder having fluid connection with said control chamber, a fluid connection communicating between the hydraulic and reaction chambers, said first and second pistons having respectively relatively smaller and larger spaced opposed reaction surfaces exposed to said reaction chamber, said second piston being connected to said control means to operate the latter by fluid displaced into said control chamber from said master cylinder, and spring means biasing said first piston in one direction toward said control chamber, said pistons having shoulders engageable when said first piston moves in said one direction whereby the force of said spring means is transmitted to said second piston to bias it toward said control chamber, the relative areas of said reaction surfaces providing a net reaction force against movement of said second piston in the other direction while said shoulders are engaged, said first piston being movable against said spring means to separate said shoulders when pressure in said reaction chamber increases to a predetermined point, whereupon the entire reaction surface of said second piston becomes effective for opposing movement of said second piston in said other direction.

9. A system according to claim 8 wherein said first piston comprises a sleeve surrounding a portion of said second piston and terminating in an exposed end constituting the reaction surface of said first piston, said second piston being slidable in said sleeve, said first piston being slidable in said reaction unit.

References Cited in the file of this patent
UNITED STATES PATENTS 2,448,464     Rockwell  --------------  Aug. 31, 1948